US012084902B2

(12) United States Patent
Hoffmann et al.

(10) Patent No.: US 12,084,902 B2
(45) Date of Patent: Sep. 10, 2024

(54) ARRANGEMENT FOR GUIDING AT LEAST ONE FOLDING/SLIDING DOOR

(71) Applicant: Julius Blum GmbH, Hoechst (AT)

(72) Inventors: Benjamin Hoffmann, Dornbirn (AT); Marc Meusburger, Egg (AT)

(73) Assignee: Julius Blum GmbH, Hoechst (AT)

( * ) Notice: Subject to any disclaimer, the term of this patent is extended or adjusted under 35 U.S.C. 154(b) by 575 days.

(21) Appl. No.: 17/314,765

(22) Filed: May 7, 2021

(65) Prior Publication Data

US 2021/0262267 A1 Aug. 26, 2021

Related U.S. Application Data

(63) Continuation of application No. PCT/AT2019/060365, filed on Nov. 5, 2019.

(30) Foreign Application Priority Data

Nov. 13, 2018 (AT) .............................. A 50975/2018

(51) Int. Cl.
*E05D 15/58* (2006.01)
*A47B 77/00* (2006.01)
(Continued)

(52) U.S. Cl.
CPC .............. *E05D 15/58* (2013.01); *A47B 77/00* (2013.01); *E05D 15/0604* (2013.01);
(Continued)

(58) Field of Classification Search
CPC ... E05D 15/58; E05D 15/0604; E05D 15/264; A47B 77/00; E05F 7/06; E05Y 2900/212
See application file for complete search history.

(56) References Cited

U.S. PATENT DOCUMENTS 1,489,734 A 4/1924 Brasch
2,827,957 A 3/1958 Haws
(Continued)

FOREIGN PATENT DOCUMENTS

AT 519246 5/2018
AT 519479 7/2018
(Continued)

OTHER PUBLICATIONS

International Search Report dated Jan. 21, 2020 in International (PCT) Application No. PCT/AT2019/060365.
(Continued)

*Primary Examiner* — Daniel J Rohrhoff
(74) *Attorney, Agent, or Firm* — Wenderoth, Lind & Ponack, L.L.P.

(57) ABSTRACT

An arrangement has at least two door leaves which are connected to one another in an articulated manner, and can be moved between a parallel position, in which the at least two door leaves are oriented substantially parallel to one another, and a coplanar position, in which the at least two door leaves are oriented in a substantially coplanar manner. The arrangement includes a guide rail for fastening on a fixed furniture part, and a guide device to be connected to a folding/sliding door and mounted to be moved on the guide rail. The arrangement has a vertical carrier on which the folding/sliding door can be mounted in a pivotable manner. The guide rail and/or the guide device comprises a force store by which the folding/sliding door can be subjected to a force directed counter to the weight-induced force.

24 Claims, 7 Drawing Sheets

(51) Int. Cl.

| | |
|---|---|
| ***E05D 15/06*** | (2006.01) |
| ***E05D 15/26*** | (2006.01) |
| ***E05F 7/06*** | (2006.01) |
| ***E06B 3/48*** | (2006.01) |

(52) U.S. Cl.
CPC .............. *E05D 15/264* (2013.01); *E05F 7/06* (2013.01); *E06B 3/482* (2013.01); *E05Y 2900/212* (2013.01)

(56) References Cited

U.S. PATENT DOCUMENTS

| | | | | |
|---|---|---|---|---|
| 3,287,759 | A * | 11/1966 | Foltz | E05D 15/26 160/199 |
| 5,920,956 | A * | 7/1999 | Salice | E05D 15/264 16/93 R |
| 6,918,157 | B2 | 7/2005 | Koike | |
| 6,945,364 | B1 | 9/2005 | Wesson et al. | |
| 7,143,871 | B2 | 12/2006 | Wesson et al. | |
| 8,376,480 | B2 | 2/2013 | Brunnmayr | |
| 9,068,386 | B2 | 6/2015 | Ishii et al. | |
| 10,753,133 | B2 | 8/2020 | Kohlweiss | |
| 11,008,791 | B2 | 5/2021 | Rupp et al. | |
| 2004/0020613 | A1 | 2/2004 | Koike | |
| 2004/0124038 | A1 | 7/2004 | Wesson et al. | |
| 2010/0229672 | A1 | 9/2010 | Brunnmayr | |
| 2015/0008811 | A1 | 1/2015 | Ishii et al. | |
| 2018/0119470 | A1 | 5/2018 | Kohlweiss | |
| 2019/0301216 | A1 | 10/2019 | Rupp et al. | |
| 2019/0301218 | A1 | 10/2019 | Rupp et al. | |
| 2019/0330896 | A1* | 10/2019 | Rupp | E05D 15/264 |
| 2020/0018107 | A1* | 1/2020 | Rupp | E05D 15/58 |
| 2021/0262262 | A1* | 8/2021 | Duer | E05D 15/0621 |
| 2021/0262266 | A1* | 8/2021 | Duer | E05D 15/063 |
| 2022/0307304 | A1* | 9/2022 | Irgang | E05D 15/063 |

FOREIGN PATENT DOCUMENTS

| | | |
|---|---|---|
| CN | 101883907 | 11/2010 |
| CN | 107735542 | 2/2018 |
| CN | 207268137 | 4/2018 |
| CN | 108518145 | 9/2018 |
| DE | 196 18 672 | 1/1997 |
| DE | 601 18 094 | 11/2006 |
| FR | 2 426 796 | 12/1979 |
| JP | 61-141478 | 9/1986 |
| JP | 2018-141271 | 9/2018 |
| JP | 2018-159228 | 10/2018 |
| TW | 200930880 | 7/2009 |
| TW | M445059 | 1/2013 |
| WO | 2013/114730 | 8/2013 |
| WO | 2018/129575 | 7/2018 |

OTHER PUBLICATIONS

Search Report dated Mar. 10, 2022 in Chinese Patent Application No. 201980074419.2.

* cited by examiner

ARRANGEMENT FOR GUIDING AT LEAST ONE FOLDING/SLIDING DOOR

BACKGROUND OF THE INVENTION

The invention concerns an arrangement for guiding at least one folding-sliding door having at least two door leaves which are pivotably connected together by at least one door hinge and which are moveable between a parallel position in which the at least two door leaves are oriented in substantially mutually parallel relationship and a coplanar position in which the at least two door leaves are oriented in substantially coplanar relationship. The arrangement includes at least one guide rail to be fixed to a stationary furniture part and at least one guide device which is mounted moveably on the at least one guide rail and can be connected to the at least one folding-sliding door. The arrangement has at least one vertical carrier to which the at least one folding-sliding door can be pivotably mounted, preferably wherein for that purpose there is provided at least one carrier hinge. The invention further concerns an article of furniture having at least such an arrangement.

FIGS. 1*a* to 1*d* show an article of furniture 29 having two folding-sliding doors 2 which each have two door leaves 4, 5 which are pivotably connected together by way of door hinges 3 and which are moveable between a parallel position in which the at least two door leaves 4, 5 are oriented in substantially mutually parallel relationship (see FIG. 1*c*) and a coplanar position in which the two door leaves 4, 5 are oriented in substantially coplanar relationship (see FIG. 1*a*).

The article of furniture 29 further includes a stationary furniture part 6 and an arrangement for guiding the folding-sliding door 2 relative to the stationary furniture part 6, wherein the arrangement includes a guide rail 7 fixed to the stationary furniture part 6 and for each folding-sliding door 2 a respective guide device 8 which is mounted moveably to the guide rail 7 and which can be connected to the respective folding-sliding door 2.

When the folding-sliding doors 2 are arranged in the coplanar and the parallel position the folding-sliding doors 2 are in a relatively stable state by virtue of of the stiffness of the fitment members by way of which the folding-sliding doors 2 are connected to the stationary furniture part 6. The situation is different when the folding-sliding doors 2 are arranged in an intermediate position between those two maximum positions. In that case the folding-sliding doors 2 can drop down at 39, the distance by which they drop being at the greatest in the region of the hinged connection between the door leaves 4, 5 (see FIG. 1*b*).

That door drop can have negative effects in the state of the art. Due to the angle-dependent drop, wear phenomena can happen at the fitment members, by way of which the folding-sliding doors 2 are connected to the stationary furniture part 6, in particular at the guide rail 7 and the guide device 8.

In addition the drop can even have the result that the folding-sliding doors 2 rub against the ground surface below them in an intermediate position, and that can result in jamming of the folding-sliding doors 2 and/or abrasive wear of the folding-sliding doors 2 in the lower region.

A possible way of countering that door drop involves designing the guide rail 7 and the guide device 8 to be as stable as possible. That however is only limitedly possible. In addition that approach, in particular in regard to the design structure of the guide rail 7, would result in the need for a large amount of material which in turn involves high costs.

SUMMARY OF THE INVENTION

The object of the present invention is to avoid that described disadvantages and to provide an arrangement for guiding at least one folding-sliding door in which the drop of the at least one folding-sliding door during the movement between the coplanar position and the parallel position can be reduced as much as possible without an excessive amount of material being required for that purpose. A further object of the invention is to provide an article of furniture having such an improved arrangement.

Accordingly, in the arrangement according to the invention, the at least one guide rail and/or the guide device includes at least one force storage member, by which the at least one folding-sliding door in the state of use can be subjected to a force in opposition to the force due to weight.

By virtue of that measure, it is possible to specifically counteract the door drop of the at least one folding-sliding door in an intermediate position between the coplanar position and the parallel position. In that way, the drop can be restricted to a tolerable amount at which the described disadvantages can be very substantially avoided.

According to an advantageous embodiment, it is appropriate if the at least one force storage member is adapted to provide a predetermined maximum force, preferably between 50 N and 150 N.

Alternatively or additionally thereto, the force which can be exerted by the force storage member on the at least one folding-sliding door in opposition to the force due to weight is dependent on the magnitude of the angle that the at least one folding-sliding door or the at least two door leaves include relative to the at least one guide rail, preferably wherein the force is at the greatest in an angle range of between 30° and 60°, preferably at an angle of about 45°.

An angle-dependent force is synonymous with a travel-dependent force which is exerted in dependence on the position of the at least one guide device relative to the at least one guide rail.

A technically simple but nonetheless robust solution provides that the at least one force storage member includes one or more spring elements, preferably wherein at least one of the provided spring elements is in the form of a coil spring and/or a compression spring.

In this connection, it is appropriate if the at least one force storage member includes a plurality of spring elements which are arranged spaced from each other on the at least one guide rail and/or wherein the force storage member includes at least one spring element arranged on the at least one guide device.

According to a preferred embodiment the at least one guide rail has at least one carrier and at least one track mounted moveably relative to the carrier and which preferably extends in a longitudinal direction of the guide rail. The at least one force storage member acts on the at least one track relative to the at least one carrier with a force, and preferably the at least one track is arranged at a variable spacing relative to the at least one carrier.

An alternative or supplemental embodiment provides that the at least one guide device has at least one carriage which can be supported by way of at least one preferably substantially cylindrical rolling body on the at least one guide rail and at least one connecting device mounted moveably relative to the at least one carriage for connecting the at least one folding-sliding door to the at least one guide device, wherein the at least one force storage member acts on the at least one connecting device relative to the at least one carriage with a force, preferably wherein the at least one connecting device is arranged at a variable spacing relative to the at least one carriage.

To be able to arrange the at least one folding-sliding door in the at least one stationary furniture part when the at least two door leaves are arranged substantially in the parallel position it can advantageously be provided that the arrangement includes at least one transverse rail arranged substantially transversely, preferably substantially perpendicularly, to the at least one guide rail. In that case the at least one transverse rail can be in one piece with the at least one guide rail or in the form of a separate rail.

A particularly advantageous embodiment is provided if the at least one vertical carrier is adapted to carry a greater load of the at least one folding-sliding door than the at least one guide rail and the at least one guide device mounted moveably thereto. In that case the at least one guide rail can be of a very simple and compact structure. The at least one guide rail then serves primarily the aim of affording a guiding effect and only has to support a defined residual load. A division of the loads of for example 90% (supported by the at least one vertical carrier) and 10% (supported by the at least one guide rail) has proven to be ideal.

As stated in the introductory part of this specification, an article of furniture has at least one folding-sliding door which has at least two door leaves which are pivotably connected together in particular by way of at least one door hinge and which are moveable between a parallel position in which the at least two door leaves are oriented in substantially mutually parallel relationship and a coplanar position in which the at least two door leaves are oriented in substantially coplanar relationship, at least one stationary furniture part, and at least one arrangement according to the invention for guiding the at least one folding-sliding door relative to the at least one stationary furniture part. A first one of the at least two door leaves is connected to the at least one guide device, and a second one of the at least two door leaves is connected to the at least one vertical carrier pivotably, preferably by at least one door hinge. Preferably, the at least one folding-sliding door is arranged substantially parallel to the at least one guide rail when the at least two door leaves are arranged in the coplanar position, and substantially forms an angle of about 90° relative to the at least one guide rail when the at least two door leaves are arranged in the parallel position.

It is further desirable if the article of furniture includes at least one side compartment preferably in shaft form for at least partially and preferably completely receiving the at least one folding-sliding door when the at least two door leaves are arranged substantially in the parallel position, and/or at least one internal space for receiving kitchen furniture, wherein the at least one internal space can be covered at least partially outwardly by the at least one folding-sliding door when the at least two door leaves are arranged substantially in the coplanar position.

BRIEF DESCRIPTION OF THE DRAWINGS

Further details and advantages of the invention will be described more fully hereinafter by means of the description of the figures with reference to the drawings in which.

Reference has already been partially made to FIGS. 1*a* to 1*d* in the preamble to the description. The following can be added thereto for further reference.

DETAILED DESCRIPTION OF THE INVENTION

Figure 1A:
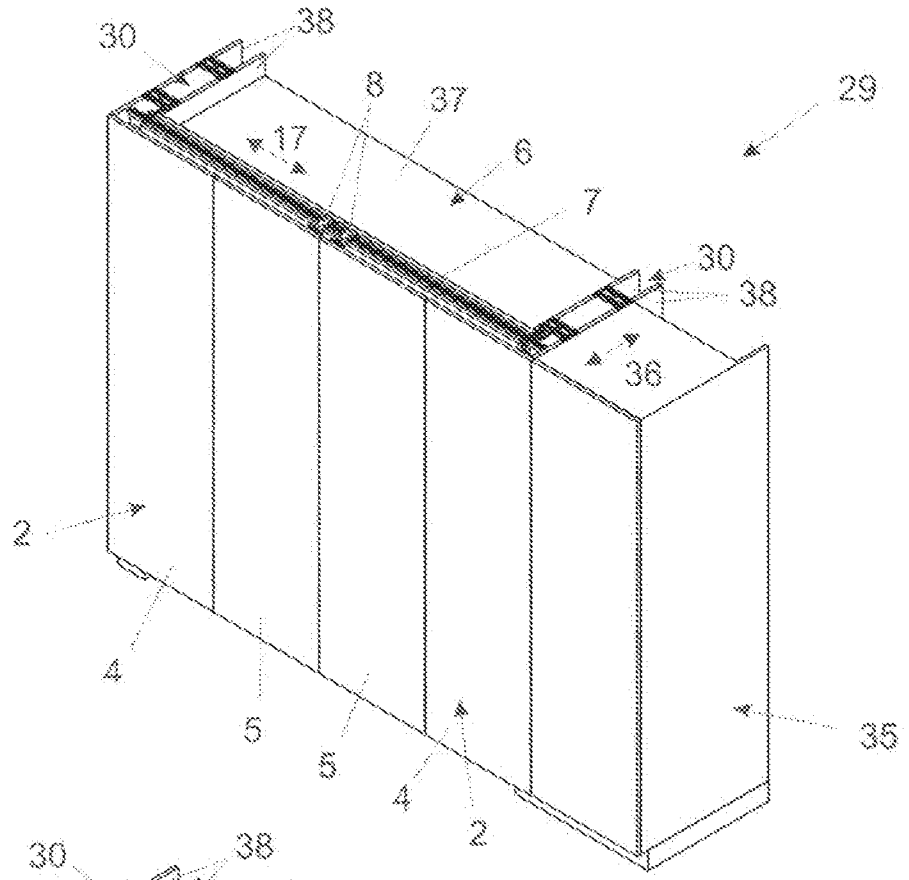
FIGS. 1*a-d* are perspective views of an article of furniture having two folding-sliding doors, wherein in FIG. 1*a* the doors are in a coplanar position, in FIG. 1*b* one of the doors is in a partly opened intermediate position, in FIG. 1*c* the doors are in a parallel position outside a stationary furniture part and in FIG. 1*d* the doors are arranged in the parallel position in side compartments of the stationary furniture part.

As can be seen from FIG. 1*a* the two folding-sliding doors 2 are arranged substantially parallel to the guide rail 7 when the two door leaves 4, 5 are arranged in the complementary position. The guide rail 7 can be fixed to a top surface 37 of the stationary furniture part 6 for example as in the specifically illustrated case.

It can be seen from Figure is that the two folding-sliding doors 2 substantially include an angle 13 of about 90° relative to the at least one guide rail 7 when the two door leaves 4, 5 are arranged in the parallel position.

The guide rail 7 can be constructed from a single piece or a plurality of portions arranged in succession in the longitudinal direction 17.

The article of furniture 29 can also be of different design configurations. By way of example there may be provided only one folding-sliding door. It is also conceivable for same to be combined with a single-leaf door.

In the specifically illustrated embodiment a high cabinet 35 is arranged adjacent to the stationary furniture part 6.

In addition a respective vertical carrier 27 is provided for each folding-sliding door 2, wherein a respective one of the two door leaves 4, 5 is connected to a guide device 8, 34 and another of the two door leaves 4, 5 is connected to the vertical carrier 27, pivotably by way of carrier hinges 28. In that case the vertical carriers 27 are adapted to carry a greater load of the respective folding-sliding door 2 than the guide rail 7 and the respective guide device 8, 34 mounted moveably thereto.

For each folding-sliding door 2 the article of furniture 29 has a respective side compartment 30 of a shaft shape, for at least region-wise receiving the folding-sliding door 2—or in the specifically illustrated case (see FIG. 1*d*) completely—when the two door leaves 4, 5 are arranged substantially in the parallel position. The side compartments 30 can be defined for example by side walls 38 of the stationary furniture part 6.

In addition the article of furniture 29 has an internal space 31 for receiving kitchen furniture 32, 33, wherein the internal space 31 can be covered outwardly by the folding-sliding doors 2 when the two door leaves 4, 5 are substantially arranged in the coplanar position. The kitchen furniture can involve for example drawers 32 or upper cabinets 33.

Figure 1B:
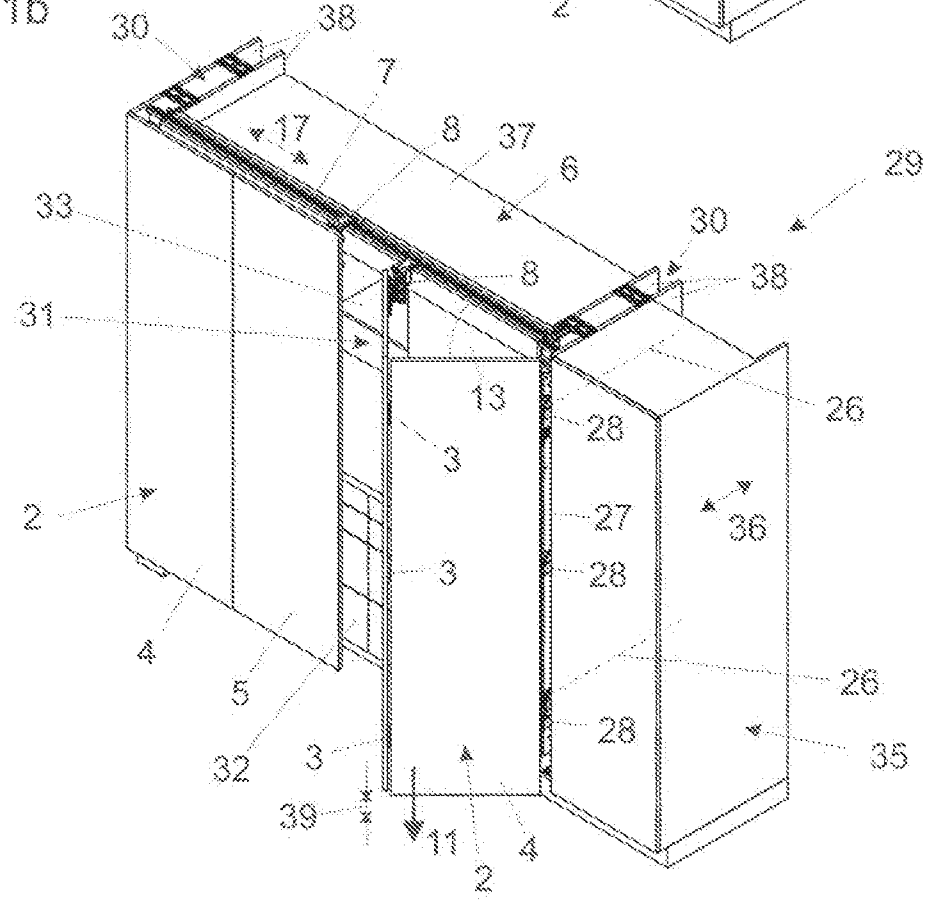
Figure 1C:
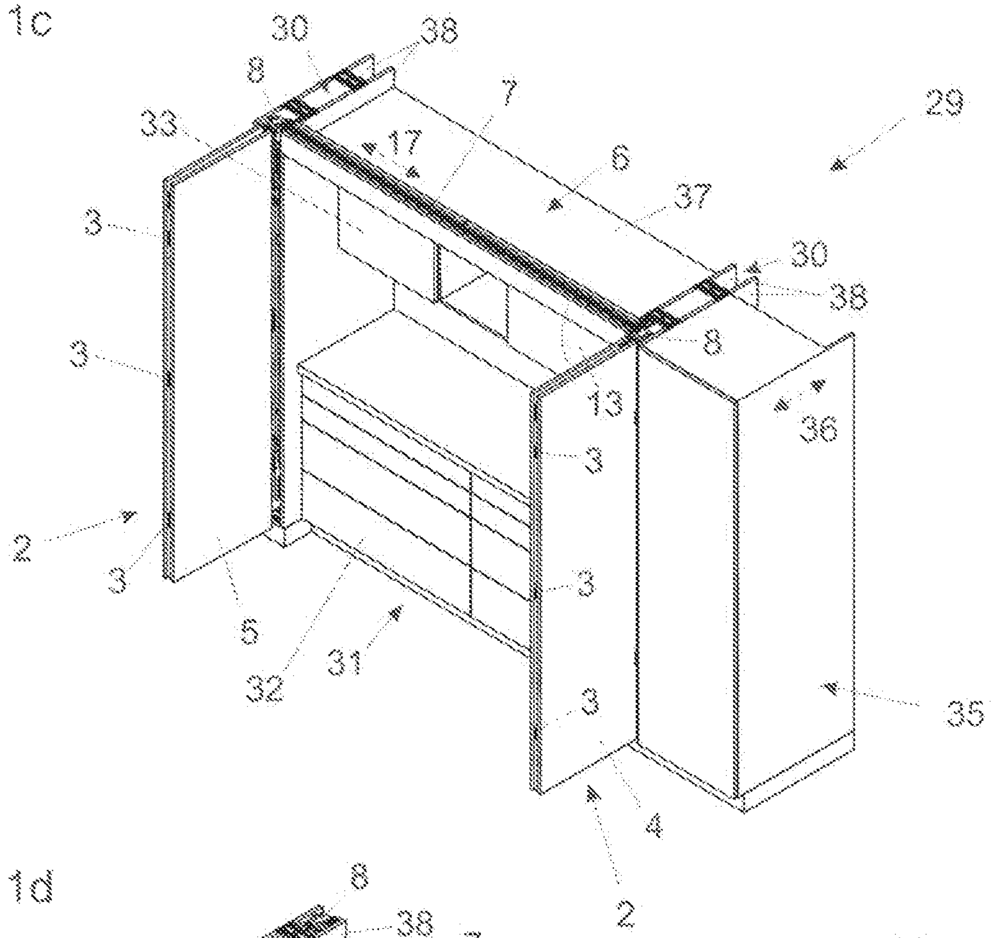
Figure 1D:
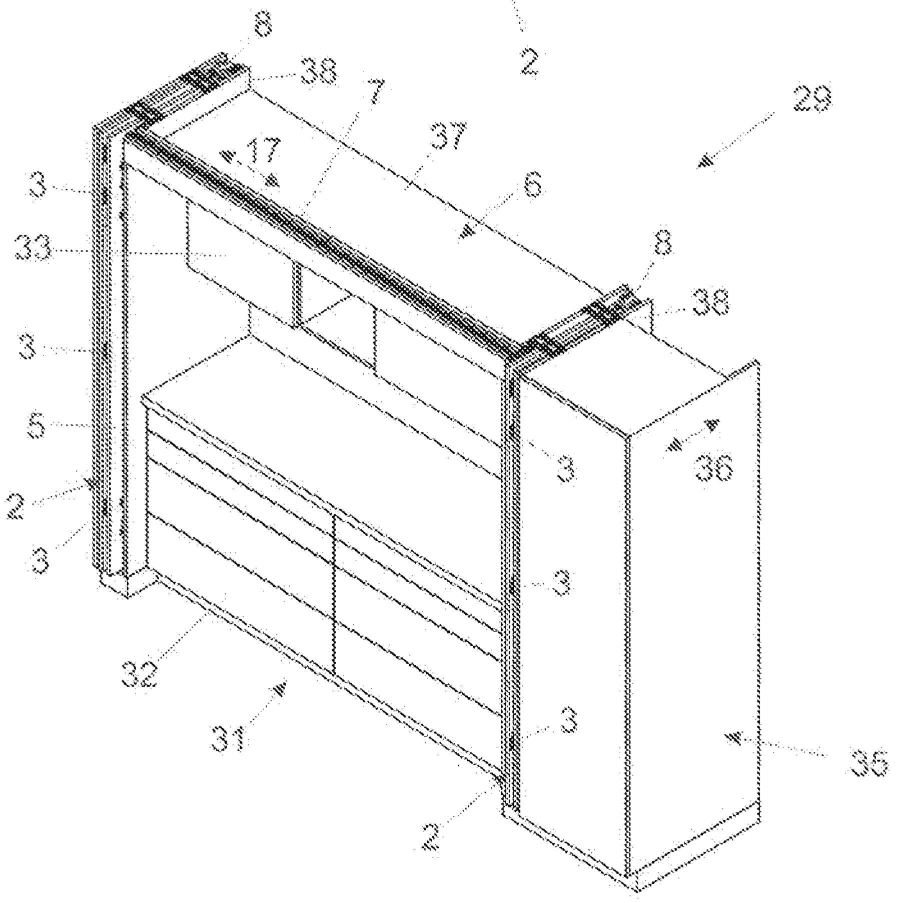

To move the folding-sliding doors 2 from the position shown in Figure is into the position shown in FIG. 1*d* (and conversely) transverse rails 26 can be provided, which are arranged substantially transversely and preferably substantially perpendicularly to the guide rail 7 (indicated in FIG. 1*b* by means of broken lines). In other words the transverse rails 26 extend in a depthwise direction 36 of the article of furniture 29.

It is desirable if the door leaf 5 with the guide device 8 is arranged in the parallel position on the vertical carrier 27 or a mounting device connected thereto and then the folded-together folding-sliding door 2 is moved into a side compartment 30 by way of the vertical carrier 27 which is mounted displaceably at the transverse rails 26.

As shown in FIG. 1*b* and as described in the introductory part of the description the folding-sliding doors 2 can suffer a drop 39 in an intermediate position.

Figure 2:
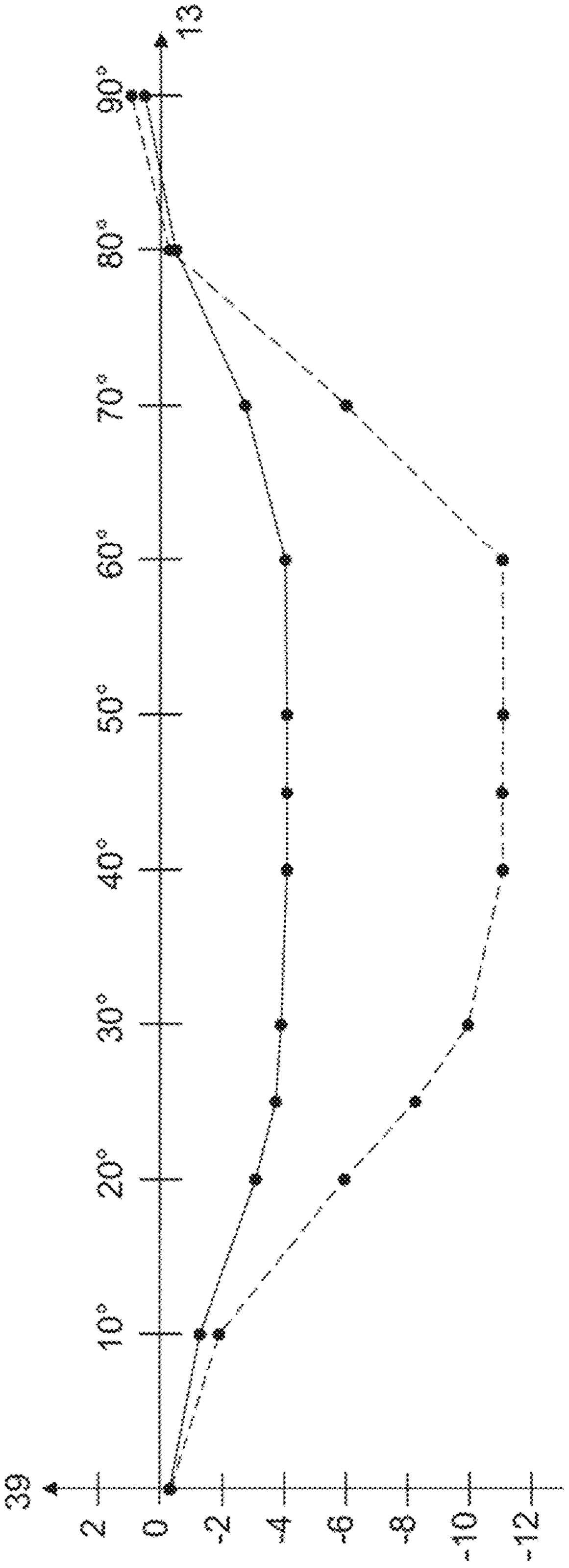
FIG. 2 shows a graph illustrating the drop of a folding-sliding door in dependence on the opening angle for a case by way of example, more specifically without force support (broken line) and with force support (solid line)
Figure 3A:
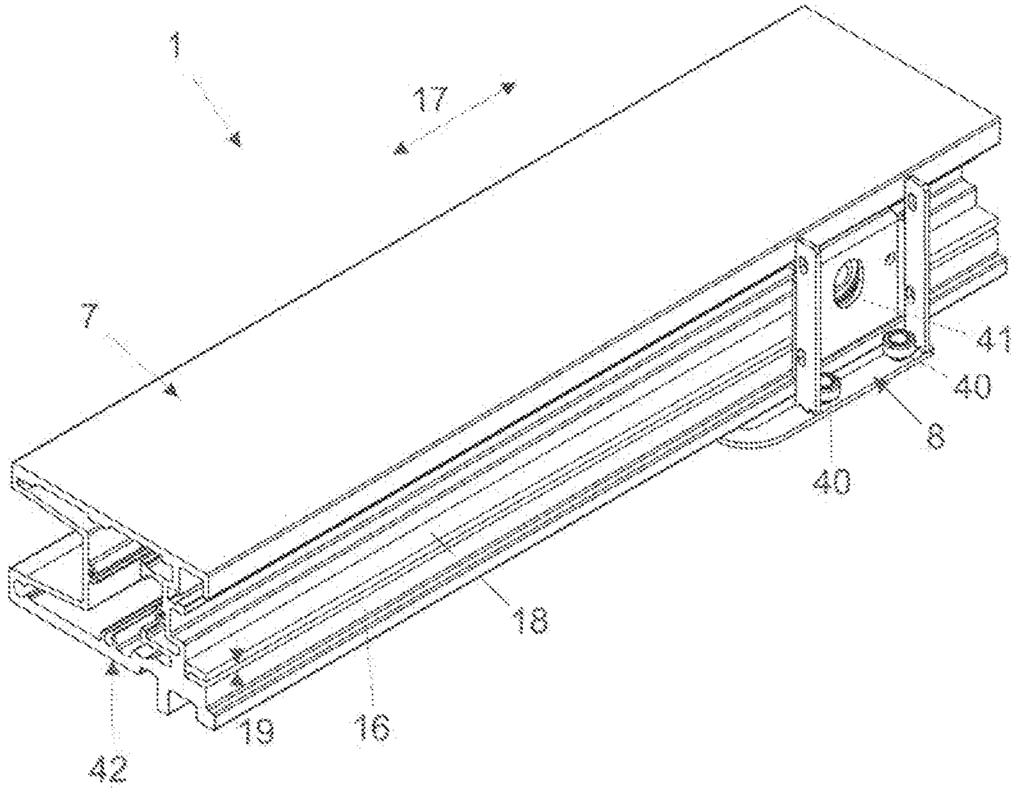
FIGS. 3*a*, 3*b* show an embodiment of an arrangement according to the invention as a diagrammatically illustrated perspective view (FIG. 3*a*) and an exploded view (FIG. 3*b*)
Figure 3B:
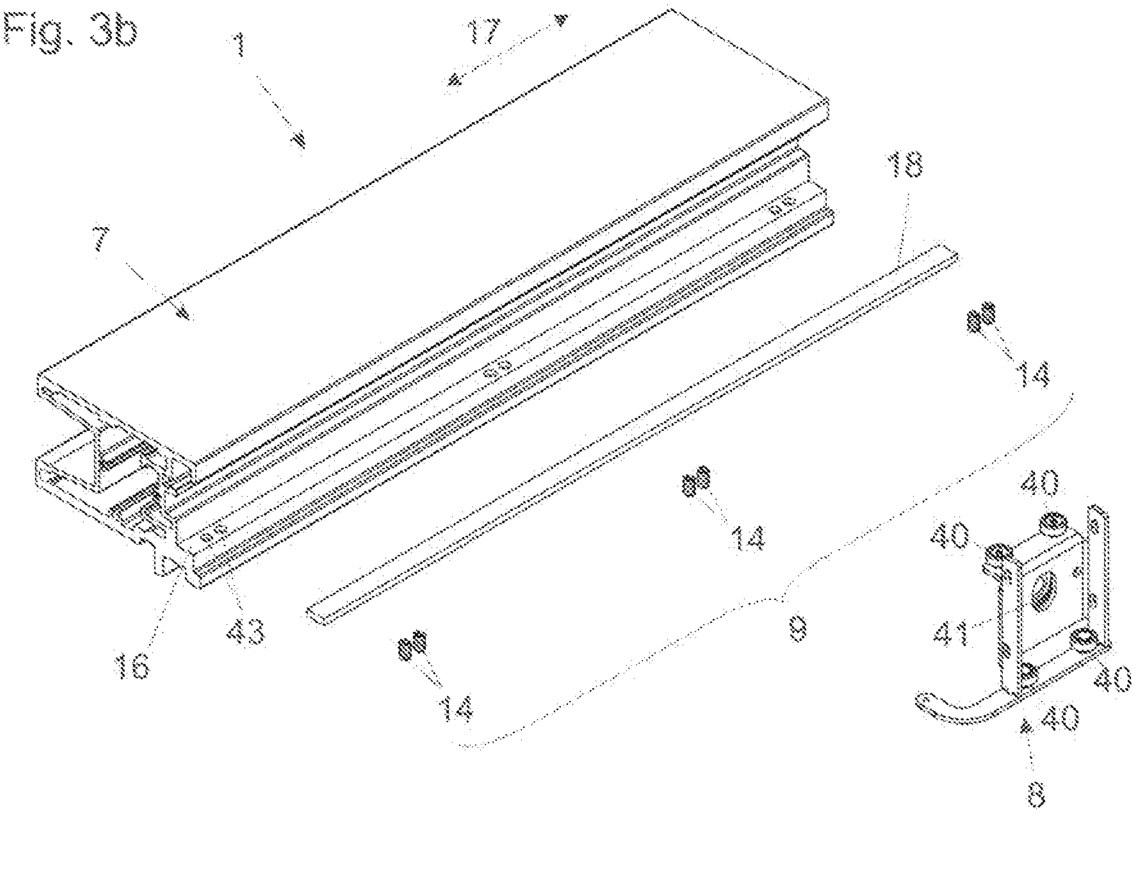

FIG. 2 shows that drop 39 for a specific situation by way of example in which the folding-sliding door is of a weight of about 70 kg, in dependence on the opening angle 13.

In that situation, without any counteracting measures, there can be a drop 39 of about 10 mm (see the broken line). That can already result in the above-described problems.

It is to be noted that the angle 0° corresponds to the coplanar position and the angle 90° corresponds to the parallel position. The reason that the drop 39 remains substantially at the same low level in an angle range of 30° to 60° is that the guide mechanism jams due to the great drop and the resulting transverse forces.

According to the invention it is now provided that the at least one guide rail 7 and/or the guide device 8, 34 includes at least one force storage member 9, 10, by which the at least one folding-sliding door 2 in the state of use can be acted upon with a force 12 in opposition to the force 11 due to weight.

In the situation by way of example shown in the graph in FIG. 2 a further curve (solid line) is shown, in which the at least one force storage member provides a maximum force of 100 N. A direct comparison with the situation without counter-measures shows that it is possible to achieve a significant reduction in the drop 39. In that respect the force 12 which can be exerted by the at least one force storage member 9, 10 on the at least one folding-sliding door 2 in opposition to the force 11 due to weight is dependent on the magnitude of the angle 13 which the at least one folding-sliding door 2 or the at least two door leaves 4, 5 include relative to the at least one guide rail 7, wherein the force 12 is at its greatest in an angle range of between 30° and 60°, preferably at an angle 13 of about 45°.

Technically that can be implemented for example as shown in FIGS. 3*a*, 3*b* and 4*a* to 4*c*.

An arrangement 1 is shown for guiding at least one folding-sliding door 2 which has at least two door leaves 4, 5 which are pivotably connected together in particular by way of at least one door hinge 3 and which are moveable between a parallel position in which the at least two door leaves 4, 5 are oriented in substantially mutually parallel relationship and a coplanar position in which the at least two door leaves 4, 5 are oriented in substantially coplanar relationship, wherein the arrangement 1 has at least one guide rail 7 to be fixed to a stationary furniture part 6 and a guide device 8 which is mounted moveably on the guide rail 7 and can be connected to the at least one folding-sliding door 2. The guide rail 7 can be fixed to a stationary furniture part 6 by way of a support surface 42.

The guide device 8 includes a force storage member 9 by which the at least one folding-sliding door 2 can be acted upon in the state of use with a force 12 in opposition to the force 11 due to weight.

The force storage member 9 is adapted to provide a predetermined maximum force, preferably between 50 N and 150 N.

In addition the force storage member 9 includes a plurality of spring elements 14 in the form of coil springs and compression springs. The spring elements 14 are arranged spaced from each other on the guide rail 7.

The guide rail 7 has a carrier 16 and a track 18 which is mounted moveably relative thereto and which extends in a longitudinal direction 17 of the guide rail 7, wherein the force storage member 9 acts on the track 18 with a force 12 relative to the carrier 16. Corresponding receiving mountings 43 can be provided to hold the spring elements 14 in the carrier 16 and/or in the track 18.

The track 18 is arranged at a variable spacing 19 relative to the carrier 16.

The guide device 8 includes a load-transmitting rolling body 41 which rolls on the track 18.

In addition the guide device 8 includes a plurality of rolling bodies 40 for lateral support for the guide device 8 on the guide rail 7.

Figure 4A:
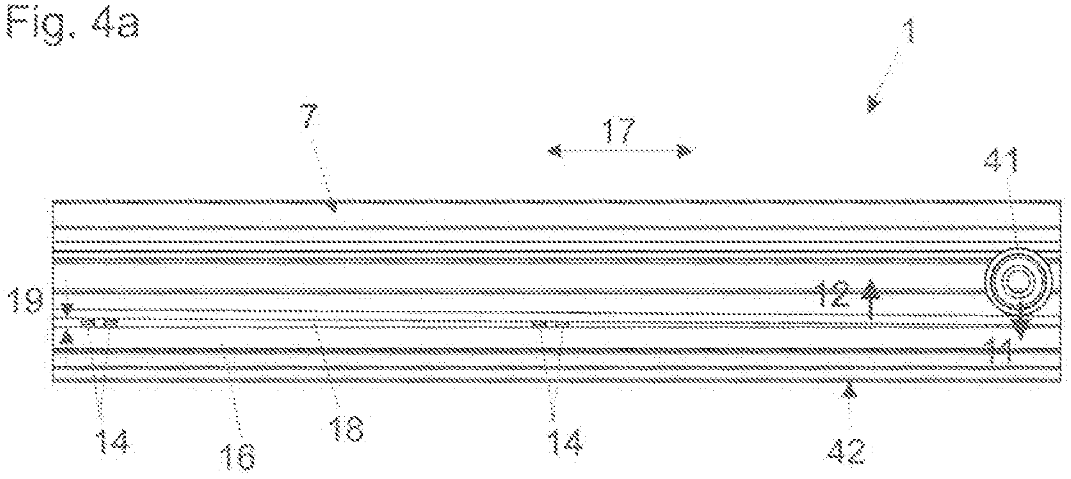
FIGS. 4*a-c* show a diagrammatic side views of the embodiment of FIGS. 3*a* and 3*b*, wherein a load-transmitting rolling body of a guide device is shown in different positions relative to the guide rail.
Figure 4B:
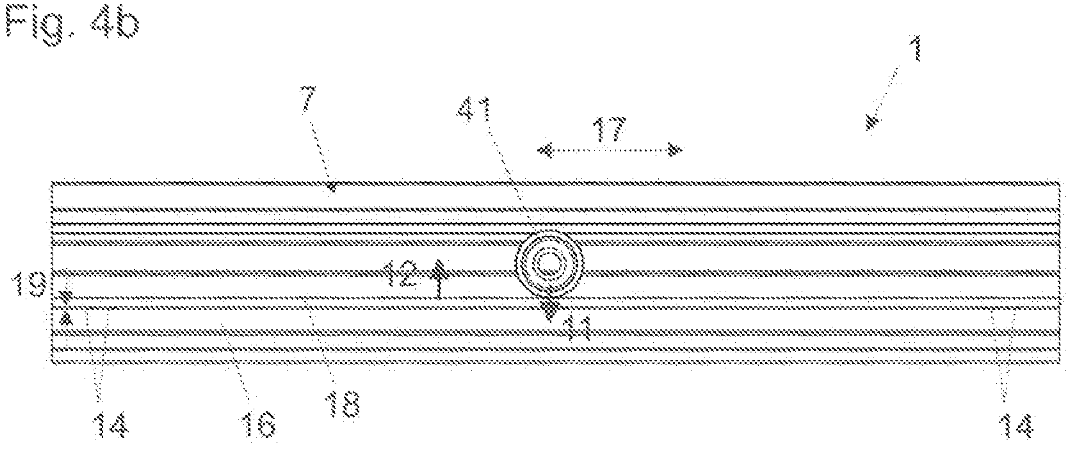
Figure 4C:
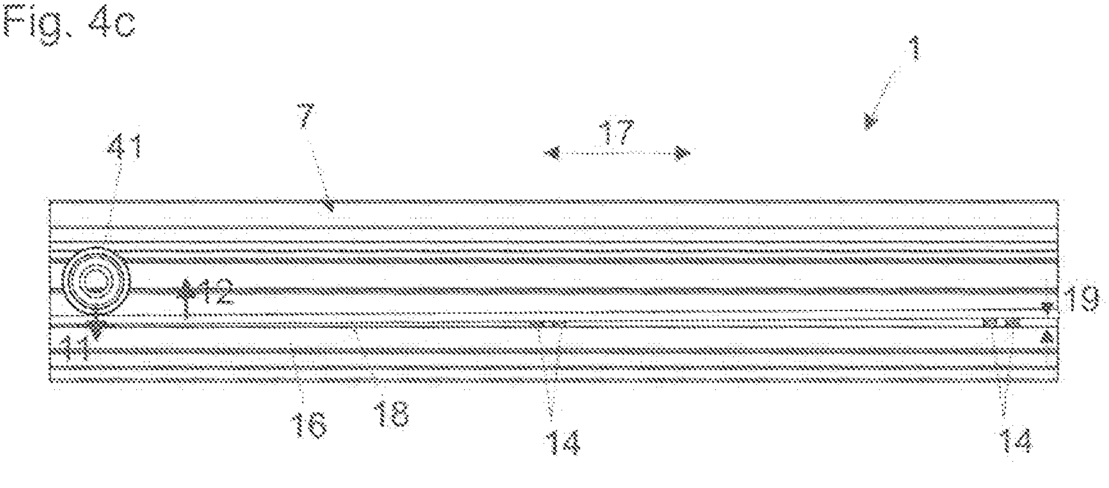
Figure 5A:
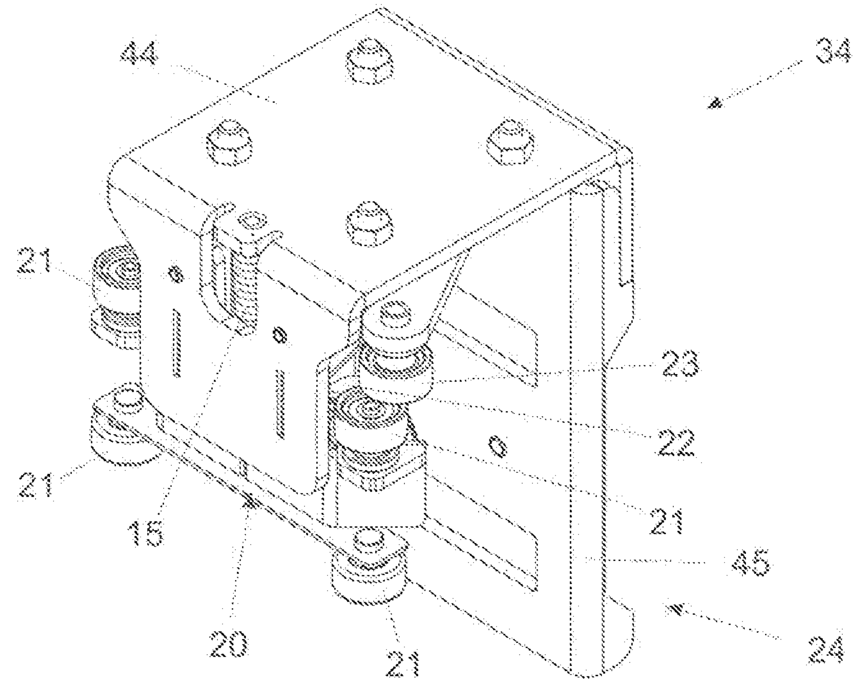
FIGS. 5*a*, 5*b* show an embodiment of a guide device which can be used in the arrangement according to the invention as a diagrammatic perspective view (FIG. 5*a*) and an exploded view (FIG. 5*b*)
Figure 5B:
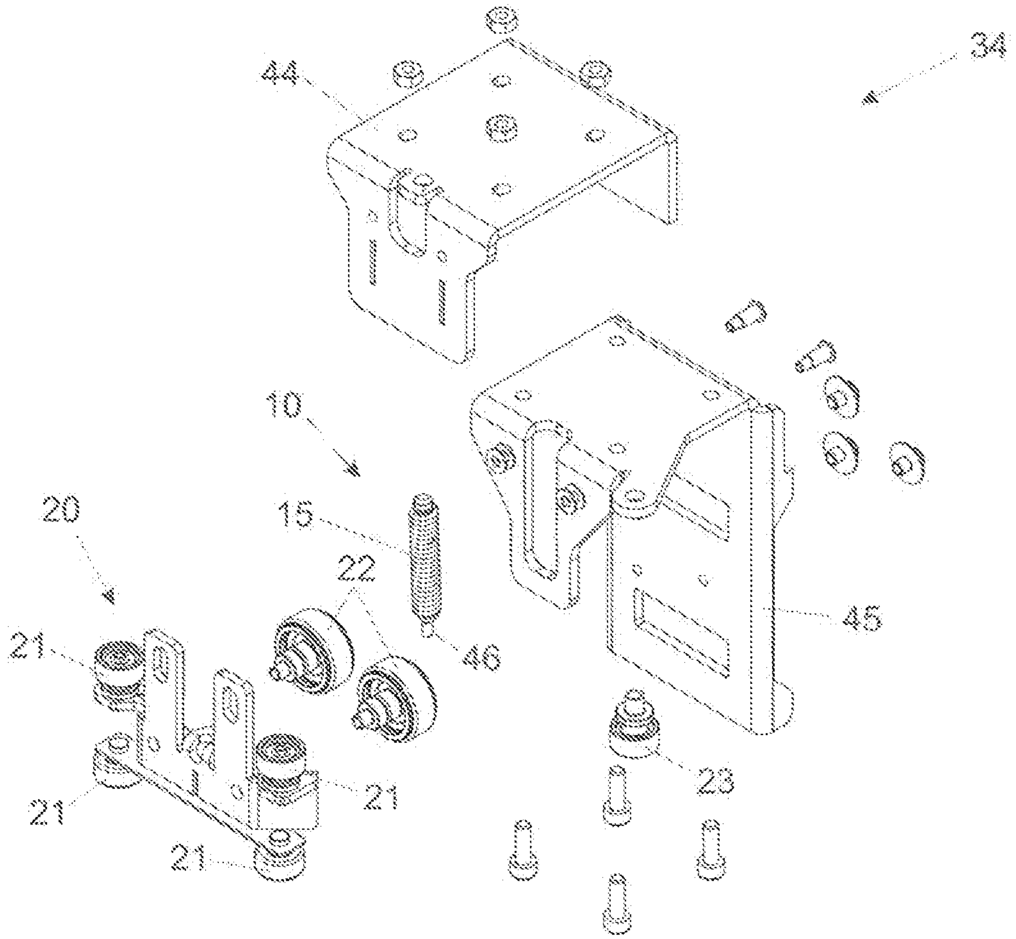
Figure 6A:
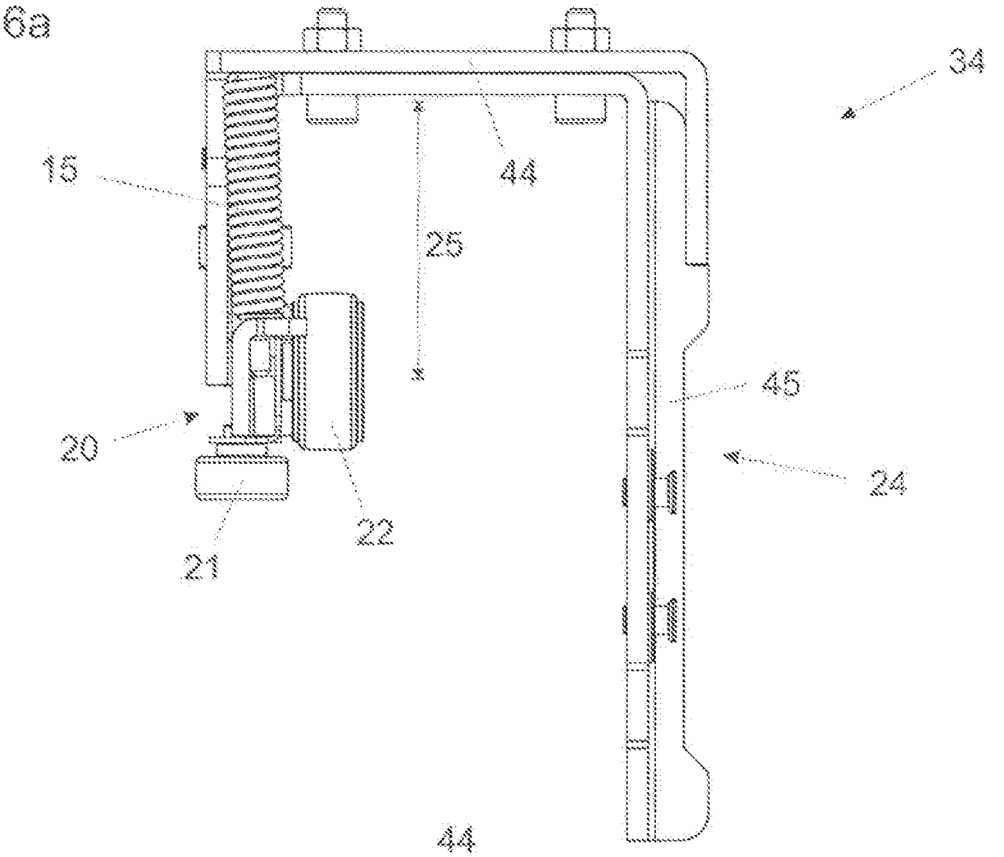
FIGS. 6*a*, 6*b* show the embodiment of FIGS. 5*a*, 5*b* as a diagrammatic side view, wherein a slightly loaded state can be seen in FIG. 6*a* and a heavily loaded state can be seen in FIG. 6*b*.
Figure 6B:
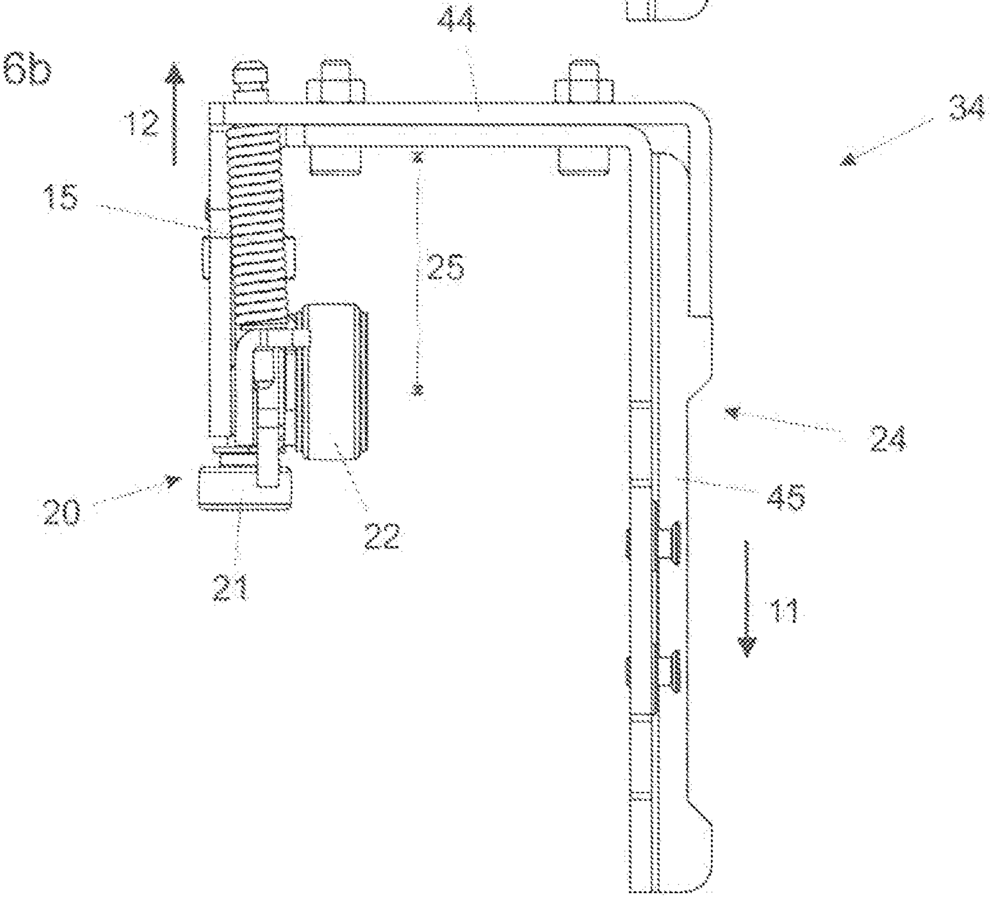

As can now be seen from FIGS. 4*a* to 4*c* the force storage member 9, depending on the respective position of the rolling body 41 or the guide device 8 relative to the guide rail 7, exerts a force 12 in opposition to the force 11 due to weight on the guide device 8 and on the folding-sliding door 2 which is or can be connected thereto. In that case the force 12 is dependent on position. In the edge regions of the guide rail 7 (see FIGS. 4*a* and 4*c*) the force 12 is lower than in the intermediate region (see FIG. 4*b*) as here a greater number of spring elements 14 are involved in the exertion of force.

In summary the guide rail 7 is of a multi-part structure, wherein a track 18 is biased by springs 14 with a defined force 12. When traveling over the track 18 the track 18 sinks.

FIGS. 5*a*, 5*b*, 6*a* and 6*b* show a further technical implementation of the invention which can be used alternatively or additionally to the embodiment shown in FIGS. 3*a*, 3*b* and 4*a* to 4*c*.

In this case the guide device 34 includes a carriage 20 which can be supported by way of substantially cylindrical rolling bodies 21, 22, 23 on the guide rail 7 and a connecting device 24 mounted moveably relative to the carriage 20 for connecting the folding-sliding door 2 to the guide device 34, wherein the force-storage member 10 applies a force 12 to the connecting device 24 relative to the carriage 20. In that case the connecting device 24 is arranged at a variable spacing 25 relative to the carriage 20, the spacing 25 becoming smaller with increasing load (see FIGS. 6*a* and 6*b*).

In this embodiment the force storage member 10 includes a spring element 15 which is in the form of a coil spring and a compression spring. A spring guide 46 is provided to prevent the spring element 15 from buckling.

The connecting device 24 is constructed substantially in the form of a U-shaped yoke 44 and a coupling portion 45 connected thereto. The connecting device 24 however can equally well be of a one-piece structure.

In summary in this embodiment the rollers 22 of the carriage 20 are sprung. The U-shaped yoke 44 presses downwardly against the force 12 of the spring 15.

The invention claimed is:

1. An arrangement for guiding a folding-sliding door having at least two door leaves pivotably connected together by a door hinge and moveable between a parallel position, in which the at least two door leaves are oriented in a substantially mutually parallel relationship, and a coplanar position, in which the at least two door leaves are oriented in substantially coplanar relationship, the arrangement comprising:

a guide rail to be fixed to a stationary furniture part, a guide device mounted moveably on the guide rail and to be connected to the folding-sliding door; and a vertical carrier to which the folding-sliding door is to be pivotably mounted, and a transverse rail arranged substantially transversely to the guide rail, wherein the guide rail and/or the guide device includes a force storage member configured to subject the folding-sliding door to a force in opposition to the force due to weight during use.

2. The arrangement according to claim 1, wherein the force storage member is configured to provide a predetermined maximum force.

3. The arrangement according to claim 2, wherein the force storage member is configured to provide the predetermined maximum force of between 50 N and 150 N.

4. The arrangement according to claim 1, wherein the force storage member is configured to exert a force on the folding-sliding door in opposition to the force due to weight such that an amount of the force is dependent on a magnitude of the angle that the folding-sliding door or the at least two door leaves include relative to the guide rail.

5. The arrangement according to claim 4, wherein the force storage member is configured such that the force exerted on the folding-sliding door is greatest in an angle range of between 30° and 60°.

6. The arrangement according to claim 5, wherein the force storage member is configured such that the force exerted on the folding-sliding door is greatest at the angle of about 45°.

7. The arrangement according to claim 1, wherein the force storage member includes one or more spring elements.

8. The arrangement according to claim 7, wherein the force storage member includes a plurality of spring elements spaced from each other on the guide rail, and/or wherein the force storage member includes a spring element arranged on the guide device.

9. The arrangement according to claim 7, wherein at least one of the one or more spring elements is a coil spring and/or a compression spring.

10. The arrangement according to claim 1, wherein the guide rail has a carrier and a track mounted moveably relative to the carrier and extending in a longitudinal direction of the at least one guide rail, wherein the force storage member is configured to act on the track relative to the at least one carrier with a force.

11. The arrangement according to claim 10, wherein the track is arranged at a variable spacing relative to the carrier.

12. The arrangement according to claim 1, wherein the guide device has a carriage supported by a rolling body on the guide rail, and has a connecting device mounted moveably relative to the carriage for connecting the folding-sliding door to the guide device, the force storage member being configured to act on the connecting device relative to the carriage with a force.

13. The arrangement according to claim 12, wherein the connecting device is arranged at a variable spacing relative to the carriage.

14. The arrangement according to claim 12, wherein the rolling body is substantially cylindrical.

15. The arrangement according to claim 1, further comprising a carrier hinge configured to pivotably mount the vertical carrier to the folding-sliding door.

16. The arrangement according to claim 1, wherein the transverse rail is arranged substantially perpendicularly to the guide rail.

17. An arrangement for guiding a folding-sliding door having at least two door leaves pivotably connected together by a door hinge and moveable between a parallel position, in which the at least two door leaves are oriented in a substantially mutually parallel relationship, and a coplanar position, in which the at least two door leaves are oriented in substantially coplanar relationship, the arrangement comprising:

a guide rail to be fixed to a stationary furniture part;

a guide device mounted moveably on the guide rail and to be connected to the folding-sliding door; and a vertical carrier to which the folding-sliding door is to be pivotably mounted, wherein the guide rail and/or the guide device includes a force storage member configured to subject the folding-sliding door to a force in opposition to the force due to weight during use, and wherein the vertical carrier is configured to carry a greater load of the folding-sliding door than the guide rail and the guide device mounted moveably thereto.

18. The arrangement according to claim 17, further comprising a carrier hinge configured to pivotably mount the vertical carrier to the folding-sliding door.

19. An article of furniture comprising:

a folding-sliding door having at least two door leaves pivotably connected together by a door hinge, the at least two door leaves being moveable between a parallel position, in which the at least two door leaves are oriented in a substantially mutually parallel relationship, and a coplanar position, in which the at least two door leaves are oriented in a substantially coplanar relationship;

a stationary furniture part; and an arrangement for guiding the folding-sliding door relative to the stationary furniture part, the arrangement comprising:

a guide rail to be fixed to a stationary furniture part;

a guide device mounted moveably on the guide rail and to be connected to the folding-sliding door; and a vertical carrier to which the folding-sliding door is to be pivotably mounted, wherein the guide rail and/or the guide device includes a force storage member configured to subject the folding-sliding door to a force in opposition to the force due to weight during use, and wherein a first one of the at least two door leaves is connected to the guide device, and a second one of the at least two door leaves is pivotably connected to the vertical carrier.

20. The article of furniture according to claim 19, wherein the article of furniture further comprises:

a side compartment configured to at least partially receive the folding-sliding door when the at least two door leaves are arranged substantially in the parallel position, and/or an internal space for receiving kitchen furniture, wherein the internal space is at least partially coverable outwardly by the folding-sliding door when the at least two door leaves are arranged substantially in the coplanar position.

21. The article of furniture according to claim 20, wherein the side compartment is formed as a shaft configured to completely receive the folding-sliding door when the at least two door leaves are arranged substantially in the parallel position.

22. The article of furniture according to claim 19, wherein the second one of the at least two door leaves is pivotably connected to the vertical carrier by a door hinge, the folding-sliding door being arranged substantially parallel to the guide rail when the at least two door leaves are arranged in the coplanar position, and the folding-sliding door forming an angle of about 90° relative to the guide rail when the at least two door leaves are arranged in the parallel position.

23. The arrangement according to claim 22, further comprising a carrier hinge configured to pivotably mount the vertical carrier to the folding-sliding door.

24. The arrangement according to claim 19, further comprising a carrier hinge configured to pivotably mount the vertical carrier to the folding-sliding door.

* * * * *